United States Patent [19]

Seifert et al.

[11] Patent Number: 5,556,891

[45] Date of Patent: Sep. 17, 1996

[54] PREPOLYMERS CONTAINING ISOCYANATE GROUPS

[75] Inventors: Holger Seifert, Freital; Juergen Winkler; Regina Pretzsch, both of Schwarzheide, all of Germany; Robert O'Meara, Brimington, Great Britain

[73] Assignee: BASF Schwarzheide GmbH, Schwarzheide, Germany

[21] Appl. No.: 551,508

[22] Filed: Nov. 1, 1995

Related U.S. Application Data

[62] Division of Ser. No. 442,739, May 17, 1995.

[30] Foreign Application Priority Data

May 21, 1994 [DE] Germany .................... 44 17 938.3

[51] Int. Cl.⁶ ............................................ C08G 18/22
[52] U.S. Cl. .......................... 521/103; 521/99; 521/123; 521/167; 528/48; 528/49; 528/76; 528/78; 528/80; 560/26; 560/115; 560/158; 560/355; 560/358
[58] Field of Search ........................ 521/99, 103, 123, 521/167; 528/48, 49, 76, 78, 80; 560/26, 115, 158, 355, 358

[56] References Cited

U.S. PATENT DOCUMENTS

| | | | |
|---|---|---|---|
| 3,929,863 | 12/1975 | Bhahak et al. | 560/50 |
| 4,128,532 | 12/1978 | Elmers et al. | 560/85 |
| 4,507,464 | 3/1985 | Rasshofer | 560/158 |
| 4,723,032 | 2/1988 | Rasshofer et al. | 560/26 |
| 4,740,531 | 4/1988 | Rasshofer | 560/26 |

*Primary Examiner*—Morton Foelak
*Attorney, Agent, or Firm*—Paul L. Marshall

[57] ABSTRACT

The invention relates to prepolymers containing isocyanate groups which can be prepared by reacting a) organic isocyanates with b) polyetherols containing at least 2 hydroxyl groups per molecule and having molecular weights of greater than 400 and/or polyesterols containing at least 2 hydroxyl groups per molecule and having molecular weights of greater than 400, c) isocyanate-reactive compounds which are at least difunctional and have molecular weights of from 18 to 399, and, if desired, d) Lewis and/or Brönsted acidic compounds and e) conventional auxiliaries and additives, such as antioxidants, light stabilizers or fillers, wherein at least one aromatic aminopolyether alcohol of the formula

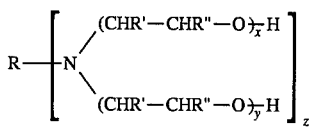

where R is aryl, alkylaryl containing one or more $C_1$- to $C_4$-alkyl groups, haloaryl, nitroaryl or cyanoaryl, R' and R" are identical or different and are, independently of one another, hydrogen, alkyl, aryl, aralkyl, alkoxyalkyl, alkoxyaryl or aroxyaryl, x and y are independent of one another and $x+y \geq 10$, z is from 1 to 4, is employed as a further component, their preparation and their use for the preparation of compact or cellular polyurethanes.

8 Claims, No Drawings

PREPOLYMERS CONTAINING ISOCYANATE GROUPS

This is a division of application Ser. No. 08/442,739 filed May 17, 1995.

The present invention relates to prepolymers containing isocyanate groups, to their preparation by reacting organic polyisocyanates and derivatives thereof with nitrogen-containing polyetherol mixtures, and to their use as the isocyanate component for the preparation of compact or cellular polyurethane-based plastics.

Compact and cellular polyurethane-based plastics and their preparation are part of the general prior art and have been described many times in the literature.

For the purposes of the present invention, polyurethane-based plastics are taken to mean not only pure polyurethane plastics, as obtained by reacting organic polyisocyanates with organic polyhydroxyl compounds, but also those during whose preparation some of the isocyanate groups react by carbodiimide, uretonimine, isocyanurate, allophanate, biuret and/or uretdione formation and/or with amino-and/or mercapto-containing reactants. These plastics can be flexible, semirigid or rigid. They can be prepared by the one-shot process or by the prepolymer process.

It is furthermore known that the isocyanates and prepolymers, in particular based on diphenylmethane diisocyanate (MDI) and derivatives thereof, employed for the preparation of these products tend to crystallize at temperatures below 20° C., which is very undesired for further processing.

The use of products having a reduced tendency toward crystallization reduces the production, storage and transport risks and thus the costs for the preparation of polyurethane plastics and their intermediates.

There has therefore been no lack of attempts to reduce the crystallization temperature of prepolymers.

In particular MDI, which only becomes liquid at above 30° C., has been modified or treated with additives for use in prepolymers.

Examples of modifications are the addition of carbodiimides and products of the reaction thereof with diisocyanates, the uretdioneimines, which can be formed in situ, for example as described in U.S. Pat. No. 3,701,796 and DE-A 2 802 521, or can be added, for example as described in DE-A-1 811 546 and DD-A-121 460. Modification of the isocyanate by isocyanurate, urea or biuret structures also suppress the tendency toward crystallization.

Improvements in the tendency toward crystallization can also be achieved by adding cyanohydrins, siloxanes, epoxides or hydrocarbons. However, additives of this type which are foreign to the system usually impair the properties of the polyurethanes, and in addition processing problems can occur.

EP-A-2768 describes a one-component foam containing, as starting material, a prepolymer containing isocyanate groups. This prepolymer is obtained by reacting a polyol mixture obtained from 90–100% by weight of an aminopolyether alcohol and/or polyester alcohol with organic polyisocyanates. However, these nitrogen-containing polyols serve to catalyze the system, and their effect on the crystallization temperature is small.

Neither does the use of specific polyol components, described, for example, in DE-A-3 527 531, achieve a significant improvement in the tendency toward crystallization.

It is an object of the present invention to provide prepolymers containing isocyanate groups which have a reduced tendency toward crystallization by adding a component which is simple to prepare and is readily compatible with the other components of the prepolymer and does not cause any disadvantages during conversion of the prepolymers into polyurethanes and in the properties of the polyurethanes.

We have found that this object is achieved by prepolymers containing isocyanate groups which can be prepared by reacting organic polyisocyanates with difunctional or polyfunctional polyetherols and/or polyesterols and with low-molecular-weight, isocyanate-reactive compounds and, as an additional component, an aromatic aminopolyetherol of the formula $$R \left[ N \begin{array}{l} (CHR'-CHR''-O)_x H \\ (CHR'-CHR''-O)_y H \end{array} \right]_z$$

where

R is aryl, alkylaryl containing one or more $C_1$- to $C_4$-alkyl groups, haloaryl, nitroaryl or cyanoaryl, R' and R'' are identical or different and are, independently of one another, hydrogen, alkyl, aryl, aralkyl, alkoxyalkyl, alkoxyaryl or aroxyaryl, x and y are independent of one another and $x+y \geq 10$, Z is from 1 to 4.

The present invention accordingly provides prepolymers containing isocyanate groups which can be prepared by reacting a) organic isocyanates with b) polyetherols containing at least 2 hydroxyl groups per molecule and having molecular weights of greater than 400 and/or polyesterols containing at least 2 hydroxyl groups per molecule and having molecular weights of greater than 400, c) isocyanate-reactive compounds which are at least difunctional and have molecular weights of from 18 to 399, and, if desired, d) Lewis and/or Brönsted acidic compounds and e) conventional auxiliaries and additives, such as antioxidants, light stabilizers or fillers, wherein at least one aromatic aminopolyether alcohol of the formula $$R \left[ N \begin{array}{l} (CHR'-CHR''-O)_x H \\ (CHR'-CHR''-O)_y H \end{array} \right]_z$$

where

R is aryl, alkylaryl containing one or more $C_1$- to $C_4$-alkyl groups, haloaryl, nitroaryl or cyanoaryl, R' and R'' are identical or different and are, independently of one another, hydrogen, alkyl, aryl, aralkyl, alkoxyalkyl, alkoxyaryl or aroxyaryl, x and y are independent of one another and $x+y \geq 10$, is from 1 to 4, is employed as a further component.

The present invention furthermore provides a process for the preparation of a prepolymer containing isocyanate groups by reacting a) organic isocyanates with b) polyetherols containing at least 2 hydroxyl groups per molecule and having molecular weights of from 400 to 12,000 and/or polyesterols containing at least 2 hydroxyl groups per molecule and having molecular weights of 400 to 10,000, c) isocyanate-reactive compounds which are at least difunctional and have molecular weights of from 18 to 399, and, if desired, d) Lewis and/or Brönsted acidic compounds and e) conventional auxiliaries and additives, such as antioxidants, light stabilizers or fillers, wherein at least one aromatic aminopolyether alcohol of the formula $$R-\left[N\begin{array}{c}(CHR'-CHR''-O)_{x}H\\ \\(CHR'-CHR''-O)_{y}H\end{array}\right]_{z}$$

where

R is aryl, alkylaryl containing one or more $C_1$- to $C_4$-alkyl groups, haloaryl, nitroaryl or cyanoaryl, R' and R" are identical or different and are, independently of one another, hydrogen, alkyl, aryl, aralkyl, alkoxyalkyl, alkoxyaryl or aroxyaryl, x and y are independent of one another and $x+y \geq 10$, Z is from 1 to 4, is employed as a further component.

The present invention furthermore provides the use of the novel prepolymers containing isocyanate groups for the preparation of polyurethane plastics, and provides the polyurethane plastics prepared in this way.

The aromatic aminopolyether alcohol is employed in an amount of from 0.01 to 5% by weight, preferably from 0.1 to 3% by weight, in each case based on the total weight of the prepolymer.

The aminopolyether alcohol is usually prepared by the adduction of oxiranes onto aromatic amines. The aromatic amines employed are monofunctional to tetrafunctional aromatic amines, which can carry one or more $C_1$–$C_4$-alkyl groups, halogen atoms, cyanide groups and/or nitro groups on the ring. Also possible are aromatic amines having a plurality of aromatic rings linked via alkyl groups, in particular those having 1 to 4, in particular 1 or 2, carbon atoms.

Preference is given to alkylaniline derivatives, such as methylaniline and ethylaniline, but in particular to aniline and tolylenediamine isomers.

Preferred oxiranes are alkylene oxides, in particular those having 2 to 5 carbon atoms, such as 1,2-butylene oxide, 1,3-propylene oxide, but preferably 1,2-propylene oxide and/or ethylene oxide.

The reaction of the aromatic amines with the oxiranes is preferably carried out by the base-catalyzed anionic reaction mechanism or uncatalyzed at from 110° to 150° C.

The aromatic amine can be reacted with the oxiranes alone, but preferably in the presence of H-functional, in particular NH-, $NH_2$- or OH-functional, coinitiators, in the presence of basic, usually alkaline, catalysts. The preferred amines and oxiranes for the preparation of the aminopolyether alcohol used according to the invention have already been mentioned. The catalysts employed can be amines, but preferably basic, in particular alkaline, hydroxides. Particular preference is given to potassium hydroxide, sodium hydroxide and/or lithium hydroxide, potassium hydroxide having the greatest industrial significance in the preparation of these products.

However, it is also possible to utilize autocatalysis of the amines and to omit additional catalysts.

It is possible to use one or more oxiranes for the preparation of the aminopolyether alcohol.

If more than one oxirane is used, the adduction onto the starting material can take place blockwise or randomly. The reaction is usually carried out under the conventional conditions for this reaction, such as temperatures of from 80° to 130° C. and pressures of from 0.1 to 1.0 MPa.

The adduction of the alkylene oxide is usually followed, in order to complete the reaction, by a post-reaction phase at the reaction temperature.

If alkali metal hydroxides and/or carbonates are used, the catalyst must be removed from the polyether alcohol after the oxirane adduction.

This is usually achieved by ion exchange or by neutralization with acids and subsequent removal of the resultant salts, in particular by centrifugation or filtration.

In order to remove water and readily volatile compounds, the polyether alcohol is subjected to distillation, usually under reduced pressure.

The following details apply to the other starting materials employed for the preparation of the novel prepolymers:

Organic isocyanates which can be employed are the customary aliphatic and aromatic difunctional and polyfunctional isocyanates.

Specific examples of aliphatic diisocyanates are isophorone diisocyanate (IPDI) and 1,6-hexamethylene diisocyanate (HDI).

However, aromatic diisocyanates and polyisocyanates are of greater importance for the novel prepolymers.

Specific mention may be made of the following compounds, without any claims as to completeness:

2,4- and 2,6-tolylene diisocyanate and commercially available isomer mixtures thereof, mixtures of 4,4'- and 2,4'-diphenylmethane diisocyanates (MDI), mixtures of MDI isomers and polyphenyl-polymethylene polyisocyanates, known as crude MDI, expediently having a content of MDI isomers of at least 50% by weight, preferably from 60 to 90% by weight or more, based on the total weight of the mixture.

Also possible are mixtures of tolylene diisocyanate isomers with MDI and/or crude MDI, for example those having an MDI content of 30–90% by weight, preferably from 40 to 80% by weight, based on the total weight of the mixture.

Also possible are modified polyisocyanates, ie. products obtained by the chemical reaction of organic diisocyanates and/or polyisocyanates. Examples which may be mentioned are polyisocyanates containing ester, hydrogen, biuret, allophanate, isocyanate and preferably carbodiimide, uretonimine and/or urethane groups.

For the novel isocyanate-terminated prepolymers, particular use is made of MDI isomers or crude MDI, which may also have been modified in the above-described manner.

The polyetherols employed are expediently those having mean functionalities of from 2 to 6 and molecular weights of from 400 to 10,000.

These polyetherols are usually prepared by the adduction of alkylene oxides onto M-functional hard substances, where the catalysts employed are usually alkaline compounds, or by cationic polymerization of alkylene oxides, where the catalysts used are Lewis acids, for example antimony pentachloride, boron fluoride etherate or bleaching earth.

Examples of suitable alkylene oxides are 1,3-propylene oxide, 1,2- and 2,3-butylene oxide, styrene oxide and preferably ethylene oxide and 1,2-propylene oxide. The alkylene oxides can be used individually, alternately and successively or as mixtures. Examples of curing agent molecules which can be used are water, organic dicarboxylic acids, aliphatic and aromatic amines, aminoalcohols, ammonia, preferably polyhydric alcohols and/or alkylene glycols, such as ethanediol, 1,2- and 1,3-propanediol, diethylene glycol, dipropylene glycol, 1,4-butanediol, 1,6-hexanediol, glycerol and trimethylolpropane, and pentaerythritol.

Suitable polyesterpolyols can be prepared, for example, from organic dicarboxylic acids having 2 to 12 carbon atoms, preferably aliphatic dicarboxylic acids having 4 to 6 carbon atoms, with polyhydric alcohols, preferably diols, having 2 to 12, preferably 2 to 6, carbon atoms. Examples of suitable dicarboxylic acids are: succinic acid, glutaric acid, adipic acid, maleic acid, phthalic acid, isophthalic acid and terephthalic acid. The dicarboxylic acids can be used individually or as a mixture with one another. It is also possible to replace the free dicarboxylic acids by the corresponding dicarboxylic acid derivatives, for example esters with alcohols having 1 to 4 carbon atoms or dicarboxylic anhydrides. It is also possible to employ polyesterpolyols made from lactones, such as ε-caprolactone, or hydroxycarboxylic acids, for example ω-hydroxycaproic acid.

Examples of Lewis and/or Brönsted acidic compounds d) are phosphoric acid, aluminum chloride, iron(III) chloride, chlorosilanes, chloroformates, benzoyl chloride, tin chloride, toluenesulfonates, dimethyl sulfate and chloroacetic acid.

They effect blocking of basic centers in the prepolymer and thus prevent undesired side reactions.

The conventional auxiliaries and additives e) which may be added to the novel prepolymer are, for example, antioxidants, light stabilizers, herbicides, pesticides and/or pigments.

Examples of suitable antioxidants are sterically hindered phenols. For the preparation of the novel prepolymers, the isocyanates are reacted with the hydroxyl-containing components. After the reaction, the auxiliaries and additives are added if necessary.

The novel prepolymers are usually prepared in batch processes.

The usual sequence is to add the polyol component to the isocyanate component, constant homogenization of the reaction mixture being necessary, in particular by stirring. Owing to the high exothermicity of the reaction, cooling must be ensured if necessary. In order to prevent side reactions, the reaction temperature should not exceed 90° C.

The sequence of addition of the polyols when more than one polyol is used depends on the intended chain structure.

The addition of the polyol components is generally followed by a post-reaction phase at the reaction temperature in order to ensure complete reaction of the reactants.

In order to exclude side reactions due to the action of atmospheric oxygen, the reaction is usually carried out under an inert gas, preferably nitrogen.

The novel prepolymer preferably has, depending on the polyol and isocyanate components employed, NCO contents in the range from 10 to 30% by weight, based on the prepolymer, and viscosities at 25° C. of from 200 to 2000 mPas.

The novel isocyanate-terminated prepolymers can be employed for the preparation of cellular or compact polyurethane plastics.

To this end, the novel prepolymers, alone or together with modified or unmodified isocyanates, are reacted with the polyol component, if desired in the presence of conventional blowing agents, auxiliaries and/or additives. The modified or unmodified isocyanates and polyol component used are the compounds described above; further details on the other reaction components can be found in the specialist literature, for example in the monograph by J. W. Saunders and K. C. Frisch, High Polymers, Volume XVI, Polyurethanes, Parts 1 and 2, Interscience Publishers, 1962 and 1964 respectively.

The prepolymers having the same structure as the novel prepolymers, but without addition of the specific aminopolyether alcohol, have a significantly higher crystallization temperature. The addition of the specific aminopolyether alcohol does not impair the mechanical properties of the polyurethane plastics.

The specific aminopolyether alcohols are simple to prepare and can be incorporated into the prepolymers with no compatibility or processing problems.

The invention is now described in greater detail with reference to the examples below.

EXAMPLE 1

65 kg of 4,4-diphenylmethane diisocyanate (MDI) and 7 kg of a carbodiimide-modified MDI having an NCO content of 29.5% by weight were introduced into a stirred reactor and warmed to 70° C., and the reactor was flushed with nitrogen. 28 kg of a polyethertriol made from glycerol and propylene oxide/ethylene oxide in a molar ratio of 8:2 and having a mean molecular weight (weight average) of 3800, 6 kg of tripropylene glycol and 1 kg of an ethoxylated aniline having an aniline:ethylene oxide weight ratio of 1:1.9 were metered successively into the reactor with constant stirring. The temperature of the reaction mixture was kept below 90° C. by cooling. When the metered addition was complete, a post-reaction was carried out at 70° C. for 2 hours. Finally, 30 g of diethylene glycol bischloroformate were added to the prepolymer.

The finished prepolymer had the following properties:

NCO contents 18.5% by weight

Viscosity at 25° C.: 1200 mPas

Crystallization temperature: −2° C.

EXAMPLE 2

The procedure was similar to that of Example 1, but the ethoxylated aniline was replaced by 1 kg of a propoxylated aniline having an aniline:propylene oxide weight ratio of 1:2.5. The resultant prepolymer had the following properties NCO content: 18.5% by weight Viscosity at 25° C. 1200 mPas Crystallization temperature: −6° C.

EXAMPLE 3 (Comparison)

The procedure was similar to that of Example 1, but no ethoxylated aniline was added. The resultant prepolymer had the following properties:

NCO content: 19% by weight

Viscosity at 25° C.: 1100 mPas

Crystallization temperatures 10° C.

EXAMPLE 4

65 kg of 4,4-diphenylmethane diisocyanate (MDI) and 7 kg of a carbodiimide-modified MDI having an NCO content of 29.5% by weight were introduced into a stirred reactor and warmed to 70° C., and the reactor was flushed with nitrogen. 28 kg of a polyethertriol made from glycerol and propylene oxide/ethylene oxide in a molar ratio of 8:2 and having a mean molecular weight (weight average) of 3800 and 1 kg of an ethoxylated aniline having an aniline/ethylene oxide weight ratio of 1:1.9 were metered successively into the reactor with constant stirring. The temperature of the reaction mixture was kept below 90° C. by cooling. When the metered addition was complete, a post-reaction was carried out at 70° C. for 2 hours. Finally, 30 g of diethylene glycol bischloroformate were added to the prepolymer.

The finished prepolymer had the following properties:

NCO content: 22% by weight

Viscosity at 25° C.: 300 mPas

Crystallization temperature: 5° C.

EXAMPLE 5

The procedure was similar to that of Example 4, but the ethoxylated aniline was replaced by 1 kg of a propoxylated aniline having an aniline:propylene oxide weight ratio of 1:2.5. The resultant prepolymer had the following properties:

NCO content: 22% by weight

Viscosity at 25° C.: 280 mPas

Crystallization temperature: 0° C.

EXAMPLE 6 (Comparison)

The procedure was similar to that of Example 4, but no ethoxylated aniline was added. The resultant prepolymer had the following properties:

NCO content: 23% by weight

Viscosity at 25° C.: 200 mPas

Crystallization temperature: 15° C.

EXAMPLE 7

65 kg of 4,4-diphenylmethane diisocyanate (MDI) and 7 kg of a carbodiimide-modified MDI having an NCO content of 29.5% by weight were introduced into a stirred reactor and warmed to 70° C., and the reactor was flushed with nitrogen. 28 kg of a polyethertriol made from glycerol and propylene oxide/ethylene oxide in a molar ratio of 8:2 and having a mean molecular weight (weight average) of 3800, 25 kg of a polypropylene glycol having a molecular weight of 1100 and 1 kg of an ethoxylated aniline having an aniline:ethylene oxide weight ratio of 1:1.9 were metered successively into the reactor with constant stirring. The temperature of the reaction mixture was kept below 90° C. by cooling. When the metered addition was complete, a post-reaction was carried out at 70° C. for 2 hours. Finally, 30 g of diethylene glycol bischloroformate were added to the prepolymer.

The finished prepolymer had the following properties:

NCO content: 16% by weight

Viscosity at 25° C.: 950 mPas

Crystallization temperature: −20° C.

EXAMPLE 8 (Comparison)

The procedure was similar to that of Example 7, but no ethoxylated aniline was added. The resultant prepolymer had the following properties:

NCO content: 23% by weight

Viscosity at 25° C.: 200 mPas

Crystallization temperature: 15° C.

EXAMPLE 9

65 kg of 4,4-diphenylmethane diisocyanate (MDI) and 7 kg of a carbodiimide-modified MDI having an NCO content of 29.5% by weight were introduced into a stirred reactor and warmed to 70° C., and the reactor was flushed with nitrogen. 28 kg of a polyethertriol made from glycerol and propylene oxide/ethylene oxide in a molar ratio of 8:2 and having a mean molecular weight (weight average) of 3800, 10.5 kg of a polypropylene glycol having a molecular weight of 450 and 1 kg of an ethoxylated aniline having an aniline:ethylene oxide weight ratio of 1:1.9 were metered successively into the reactor with constant stirring. The temperature of the reaction mixture was kept below 90° C. by cooling. When the metered addition was complete, a post-reaction was carried out at 70° C. for 2 hours. Finally, 30 g of diethylene glycol bischloroformate were added to the prepolymer.

The finished prepolymer had the following properties:

NCO content: 18.5% by weight

Viscosity at 25° C.: 800 mPas

Crystallization temperature: −15° C.

EXAMPLE 10 (Comparison)

The procedure was similar to that of Example 9, but no ethoxylated aniline was added. The resultant prepolymer had the following properties:

NCO content: 19% by weight

Viscosity at 25° C.: 750 mPas

Crystallization temperature: −5° C.

EXAMPLE 11

60 kg of 4,4-diphenylmethane diisocyanate (MDI) were introduced into a stirred reactor and warmed to 70° C., and the reactor was flushed with nitrogen. 40 kg of a polyesterpolyol made from adipic acid and ethylene glycol, diethylene glycol, 1,4-butanediol and trimethylolpropane in a weight ratio of 73.9:19.3:19.2:5.1:0.9 and having a mean molecular weight (weight average) of 2200 and 1 kg of an ethoxylated aniline having an aniline:ethylene oxide weight ratio of 1:1.9 were metered successively into the reactor with constant stirring. The temperature of the reaction mixture was kept below 90° C. by cooling. When the metered addition was complete, a post-reaction was carried out at 70° C. for 2 hours. Finally, 30 g of diethylene glycol bischloroformate were added to the prepolymer.

The finished prepolymer had the following properties:

NCO content: 18.5% by weight

Viscosity at 25° C.: 900 mPas

Crystallization temperature: −20° C.

EXAMPLE 12 (Comparison)

The procedure was similar to that of Example 11, but no ethoxylated aniline was added. The resultant prepolymer had the following properties:

NCO content: 19% by weight
Viscosity at 25° C.: 830 mPas
Crystallization temperature: −10° C.

In all cases, the NCO % by weight data are based on the weight of the prepolymer.

In order to determine the crystallization temperature, the prepolymer was introduced into a test-tube and conditioned in a cryostat for 0.5 hour. It was then removed and assessed visually for the presence of crystals. If no crystals were present, the cryostat temperature was lowered by 2 degrees and the procedure described above was repeated.

The crystallization temperature is the temperature at which the first crystals were formed.

EXAMPLE 13

In an EMB low-pressure metering machine, 100 parts by weight of the prepolymer from Example 4 were mixed with 64 parts by weight of a polyol component comprising

| | |
|---|---|
| 49 parts by weight | of polypropylene glycol containing 18% by weight of an ethylene oxide terminal block and having a mean molecular weight of 3900, |
| 37.5 parts by weight | of polyethertriol made from glycerol and propylene oxide/ethylene oxide in a weight ratio of 80:20 having a mean molecular weight of 3800, |
| 10 parts by weight | of 1,4-butanediol, |
| 1.5 parts by weight | of ethylene glycol, |
| 0.75 part by weight | of Dabco ® as catalyst, |
| 0.45 part by weight | of water, |
| 0.5 part by weight | of silicone (product x from y) and |
| 0.3 part by weight at 25° C. | of triethanolamine as crosslinking agent, |

EXAMPLE 14 (Comparison)

The procedure was similar to that of Example 13, but the prepolymer of Example 4 was replaced by 66 parts by weight of the prepolymer from Example 5. The properties of the polyurethane are shown in Table 1.

TABLE 1

| | Example 13 | Example 14 | DIN |
|---|---|---|---|
| Density (kg/m$^3$) | 520 | 530 | 53420 |
| Elongation at break (%) | 290 | 300 | 53504 |
| Tensile strength (MPa) | 3.4 | 3 | 53504 |
| Tear propagation strength (N/mm$^2$) | 5.1 | 4.6 | 53507 |
| Abrasion (mg) | 124 | 174 | 53516 |
| Shore A hardness | 55 | 53 | 53505 |

We claim:

1. A prepolymer containing isocyanate groups which can be prepared by reacting
   a) organic isocyanates with
   b) polyetherols containing at least 2 hydroxyl groups per molecule and having molecular weights of greater than 400 and/or polyesterols containing at least 2 hydroxyl groups per molecule and having molecular weights of greater than 400,
   c) isocyanate-reactive compounds which are at least difunctional and have molecular weights of from 18 to 399, and, optionally,
   d) Lewis and/or Brönsted acidic compounds and
   e) conventional auxiliaries and additives, such as antioxidants, light stabilizers or fillers, wherein at least one aromatic aminopolyether alcohol of the formula $$R-\left[N\begin{array}{c}(CHR'-CHR''-O)_{\overline{x}}H\\(CHR'-CHR''-O)_{\overline{y}}H\end{array}\right]_z$$

where
  R is aryl, alkylaryl containing one or more $C_1$- to $C_4$-alkyl groups, haloaryl, nitroaryl or cyanoaryl,
  R' and R" are identical or different and are, independently of one another, hydrogen, alkyl, aryl, aralkyl, alkoxyalkyl, alkoxyaryl or aroxyaryl,
  x and y are independent of one another and
  $X+y \geq 10$,
  Z is from 1 to 4,
is employed as a further component.

2. A prepolymer containing isocyanate groups as claimed in claim 1, wherein the aromatic aminopolyether alcohol is employed in an amount of from 0.01 to 5% by weight, based on the total weight of the prepolymer.

3. A prepolymer containing isocyanate groups as claimed in claim 1 or 2, wherein the aromatic aminopolyether alcohol is employed in an amount of from 0.1 to 3% by weight, based on the total weight of the prepolymer.

4. A prepolymer containing isocyanate groups as claimed in claim 1, wherein aniline is employed as starting material for the aromatic aminopolyether alcohol.

5. A prepolymer containing isocyanate groups as claimed in claim 4, wherein the aromatic aminopolyether alcohol is prepared by the base-catalyzed adduction of ethylene oxide onto aniline.

6. A prepolymer containing isocyanate groups as claimed in claim 4, wherein the aromatic aminopolyether alcohol is prepared by the base-catalyzed or uncatalyzed adduction of propylene oxide onto aniline.

7. A prepolymer containing isocyanate groups as claimed in claim 4, wherein the aromatic aminopolyether alcohol is prepared by the base-catalyzed adduction of propylene oxide and ethylene oxide onto aniline.

8. A process for the preparation of polyurethane plastics by reacting
   a) organic isocyanates with
   b) isocyanate-reactive H-functional compounds, optionally in the presence of
   c) catalysts,
   d) blowing agents and
   e) conventional auxiliaries and additives,
wherein the organic isocyanates a) employed are prepolymers containing isocyanate groups as claimed in claim 1, optionally mixed with other isocyanates.

* * * * *